United States Patent
Cividini et al.

(10) Patent No.: US 11,215,250 B2
(45) Date of Patent: Jan. 4, 2022

(54) SHAPED MATERIAL AND MANUFACTURING METHOD

(71) Applicant: FRENI BREMBO S.p.A., Bergamo (IT)

(72) Inventors: Omar Cividini, Bergamo (IT); Lorenzo Miglioli, Bergamo (IT)

(73) Assignee: FRENI BREMBO S.p.A., Bergamo (IT)

( * ) Notice: Subject to any disclaimer, the term of this patent is extended or adjusted under 35 U.S.C. 154(b) by 1040 days.

(21) Appl. No.: 15/578,609

(22) PCT Filed: Jun. 8, 2016

(86) PCT No.: PCT/IB2016/053340
§ 371 (c)(1),
(2) Date: Nov. 30, 2017

(87) PCT Pub. No.: WO2016/199021
PCT Pub. Date: Dec. 15, 2016

(65) Prior Publication Data
US 2018/0156289 A1 Jun. 7, 2018

(30) Foreign Application Priority Data

Jun. 10, 2015 (IT) .......................... UB2015A000940

(51) Int. Cl.
*F16D 65/12* (2006.01)
*C04B 35/83* (2006.01)
(Continued)

(52) U.S. Cl.
CPC .......... *F16D 65/126* (2013.01); *C04B 35/573* (2013.01); *C04B 35/80* (2013.01);
(Continued)

(58) Field of Classification Search
CPC ..... C04B 35/806; C04B 35/573; C04B 35/83; F16D 65/121; F16D 65/126; F16D 2200/0052; F16D 2200/0082
(Continued)

(56) References Cited

U.S. PATENT DOCUMENTS 4,955,123 A * 9/1990 Lawton ................... D04H 3/002
29/411
5,323,523 A * 6/1994 Lawton ................... B29B 11/16
28/107
(Continued)

FOREIGN PATENT DOCUMENTS

EP 0 721 835 A2 7/1996

OTHER PUBLICATIONS

International Search Report and Written Opinion of the International Searching Authority for corresponding International Patent Application No. PCT/IB2016/053340 dated Sep. 27, 2916, 11 pages.

*Primary Examiner* — Robert A. Siconolfi
*Assistant Examiner* — San M Aung
(74) *Attorney, Agent, or Firm* — Merchant & Gould P.C.

(57) ABSTRACT

Shaped material (1), in particular a disc for a disc brake includes layers (2, 4, 6) of carbon fibers stacked in a construction direction (X). Each layer (2, 4, 6) has segments (8, 10) placed side by side and joined together to form the layer, the segments of a layer (2, 4, 6) include radial segments (8) and transverse segments (10). In each layer (2, 4, 6) of carbon fibers, the number of transverse segments (10) is greater than the number of radial segments (8). A method manufactures a shaped material.

19 Claims, 2 Drawing Sheets

(51) Int. Cl.
*C04B 35/573* (2006.01)
*C04B 35/80* (2006.01)

(52) U.S. Cl.
CPC ............ *C04B 35/83* (2013.01); *F16D 65/121* (2013.01); *F16D 2200/0052* (2013.01); *F16D 2200/0082* (2013.01)

(58) Field of Classification Search
USPC ..................................................... 188/250 R
See application file for complete search history.

(56) References Cited

U.S. PATENT DOCUMENTS

| | | | | |
|---|---|---|---|---|
| 5,388,320 | A * | 2/1995 | Smith ..................... | B29B 11/16 28/107 |
| 5,705,264 | A * | 1/1998 | Lawton .................. | D01G 25/00 428/408 |
| 2001/0001189 | A1 * | 5/2001 | Johnson ................ | F16D 65/121 188/251 A |
| 2002/0170787 | A1 * | 11/2002 | James .................... | D04H 18/02 188/218 XL |
| 2004/0029704 | A1 * | 2/2004 | Kajii ..................... | C04B 35/645 501/88 |
| 2015/0140256 | A1 * | 5/2015 | Valle .................... | C23C 16/045 428/66.2 |
| 2016/0017526 | A1 * | 1/2016 | Miao .................... | D04H 1/4374 428/66.6 |

* cited by examiner

SHAPED MATERIAL AND MANUFACTURING METHOD

This application is a National Stage Application of PCT/IB2016/053340, filed 8 Jun. 2016, which claims benefit of Ser. No. 10/201,5000022374, filed 10 Jun. 2015, and which applications are incorporated herein by reference. To the extent appropriate, a claim of priority is made to each of the above disclosed applications.

BACKGROUND OF THE INVENTION

This invention relates to a shaped material, preferably a disc for a brake disc, and a process for the realisation of such material.

The use of discs for disc brakes made with carbon-based materials (so-called Carbon Carbon, or "C/C") has long been known.

These discs are obtained by a process that provides for the superimposition of layers of woven and/or non-woven fabric, the possible addition of resins, densification processes with carbon via liquid or gas, and suitable subsequent heat treatments.

The densification processes may for example be performed by means of CVD (Chemical Vapour Deposition), CVI (Chemical Vapour Infiltration) or LPI (Liquid Polymer Infiltration).

In some applications these materials may be used for working as friction elements at high temperatures, a circumstance that does not make them suitable for standard road applications, but rather high-range applications.

Traditionally, for the production of C/C disc-brake discs, due to the special architecture that is formed inside the related stratified structure, there are regions of the disc that are critical to the structural level because they have a low resistance with respect to applied load.

It follows that, in correspondence of these regions, cracks or fractures could be created that are unacceptable for certain high use ranges from the point of view of performance, for the most extreme braking applications, as in the case of sports cars or even in other means of transport that travel at high speeds.

SUMMARY OF THE INVENTION

This invention relates to the preceding context, proposing to provide a shaped material and a method able to drastically reduce the possibility of fractures in a disc brake, and isotropic mechanical properties in spite of the structure of this shaped material being inherently asymmetric.

BRIEF DESCRIPTION OF THE DRAWINGS

The object of this invention will now be described in detail, with the help of the accompanying drawings, in which.

DETAILED DESCRIPTION OF THE DRAWINGS

With reference to the above-mentioned figures, reference number 1 identifies a shaped material in its entirety. Preferably, the shaped material according to this invention relates to a disc for a brake disc, advantageously a ventilated type disc.

Preferably, the shaped material 1 is characterised in that it has a residual porosity of less than 5%, for example equal to, or smaller than, 3%.

Preferably, the value of this residual porosity is considered for a shaped material 1 comprising areas of silicon carbide SiC, specifically at the end of at least one step of infiltration with silicon Si, as better described below.

Figure 1:
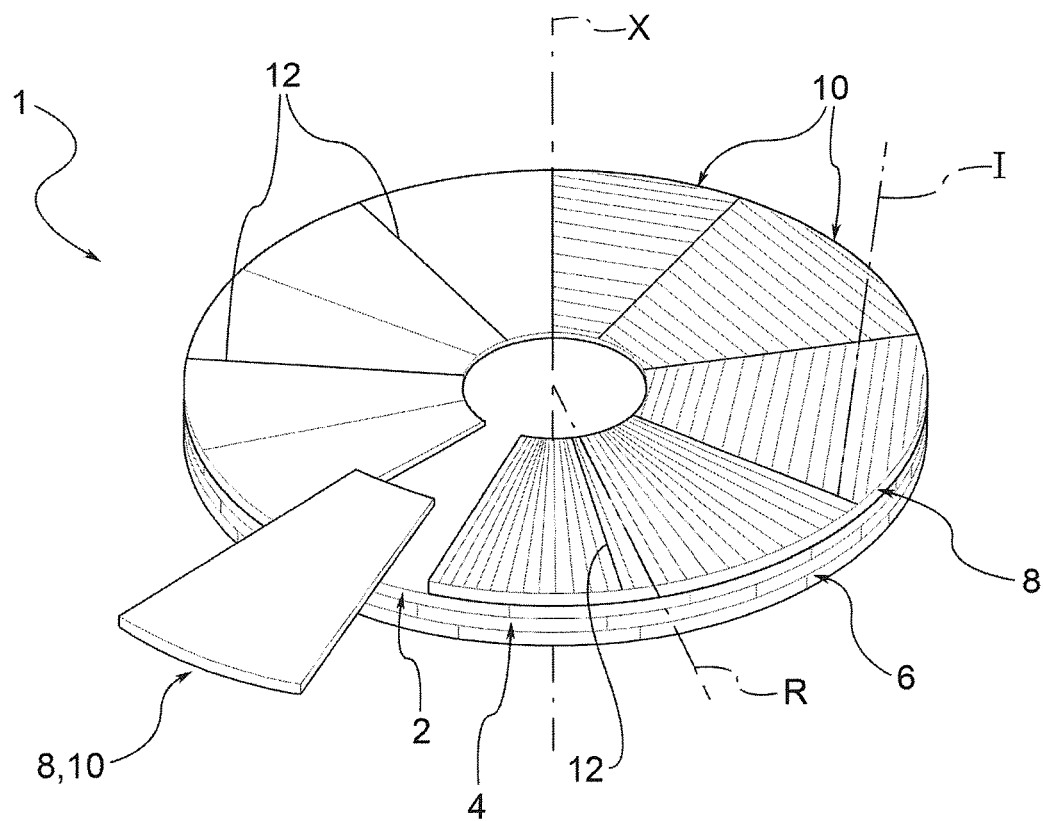
FIG. 1 is a perspective view of a fabrication step of the shaped material of this invention, according to a possible embodiment.
Figure 2:
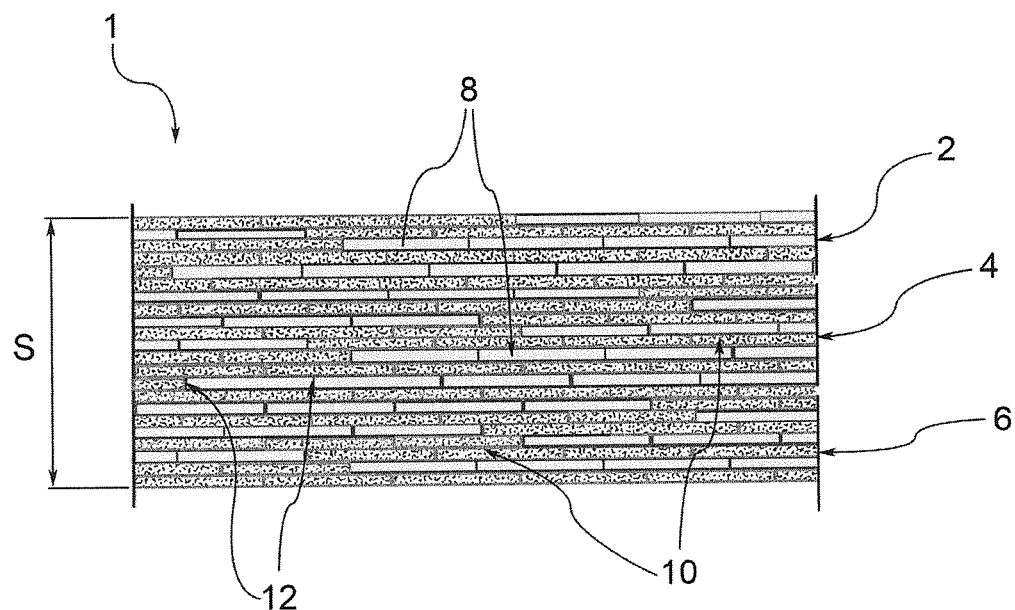
FIG. 2 is a lateral schematic view of the composition and number of layers of a shaped material according to a possible variant.

The shaped material 1 comprises a plurality of layers 2, 4, 6 of carbon fibres, these layers being stacked along a construction direction X, for example vertical as shown in FIG. 1.

Merely by way of example, at least part of the carbon fibres (preferably all such fibres) can be derived from oxidised polyacrylonitrile fibres. For example, such fibres are produced by the company SGL Carbon SE under the tradename Panox®.

According to a preferred variant, the shaped material 1 comprises a carbonaceous matrix (i.e., composed at least 50% of carbon) in which part of the carbon fibres is at least partially englobed.

In this description, unless otherwise specified, the terms "radial", "axial", "angular" and "circumferential" will always be understood with respect to the direction construction X.

According to a variant, construction direction X is oriented parallel to a rotation axis of the shaped material 1 or of the disc for disc brake, during its use.

According to a preferred variant, the number of layers 2, 4, 6 of carbon fibres (or the number of coils of the segments 8, 10; in this regard see below) is comprised in the range 10-50, advantageously 18-40, for example 28-40 or 18-26, optionally in the range of 20-24. For example, the number of layers/coils could be about 21-23.

Merely by way of example, along the construction direction X, the shaped material may have a thickness S equal to about 40 millimetres or more, specifically between about 40-300 millimetres.

Each layer 2, 4, 6 comprises a plurality of segments 8, 10 side by side and joined together to form the aforesaid layer, the segments of a layer 2, 4, 6 comprising radial segments 8 and transverse segments 10.

Figure 3:
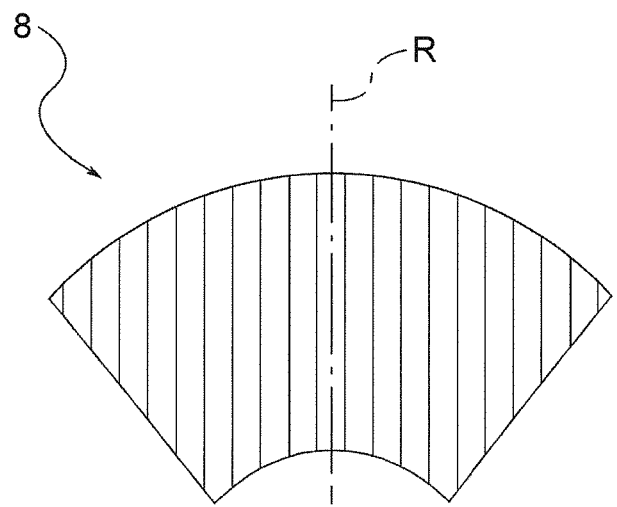
FIGS. 3 and 4 illustrate, respectively, a radial segment and a transverse segment employable in the shaped material of this invention.
Figure 4:
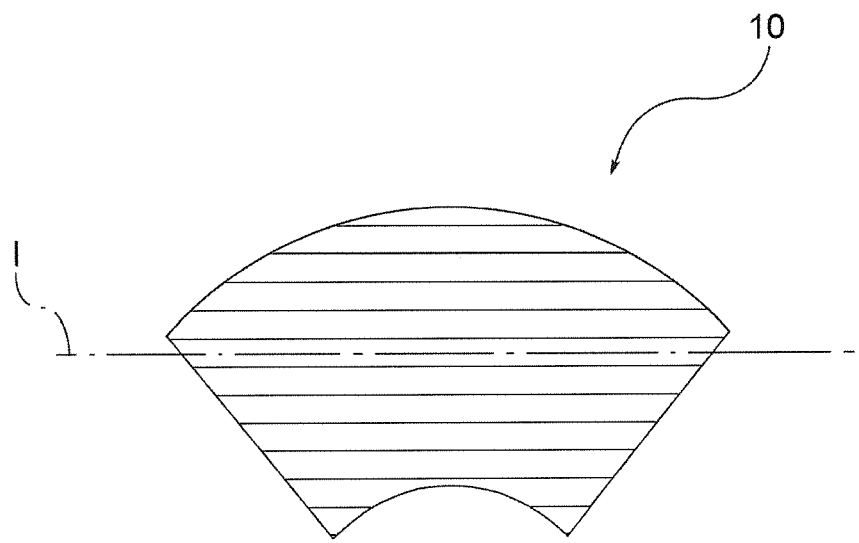

The radial segments 8 are segments in which the carbon fibres are predominantly oriented in a radial direction R with respect to the construction direction X, or oriented approximately parallel to the radial direction R. On the contrary, the transverse segments 10 are segments in which the carbon fibres are predominantly oriented in a direction I incident to the preceding radial direction R. In this regard, refer to the diagrams of FIGS. 3 and 4 that respectively show the orientations of a radial direction and a transverse direction of the respective segments 8, 10.

According to a preferred variant, the incident direction I is substantially perpendicular to the radial direction R.

Preferably, at least part of the segments 8, 10 is in the form of a circular sector or of an arc circumference, as for example shown in FIG. 1. Advantageously, the circumferential width of these sectors or arches may be in the range 60-90°, advantageously 60-80°, optionally in the range of 65-72°, for example approximately 68°.

For example, all the segments could have substantially the same form.

According to a further preferred variant, each segment 8, 10 comprises mainly or exclusively unidirectional carbon fibres, arranged in the radial direction R or in the incident direction I depending on the type of segment.

According to an embodiment, the segments 8, 10 extend in a spiral around the construction direction X in a substantially continuous manner through the plurality of layers 2,4,6 of carbon fibres.

According to an advantageous embodiment, with respect to the construction direction X, the segments of a layer 2 are angularly offset with respect to the segments of an adjacent layer 4 (specifically: in an axial direction), so that the joining zones 12 between the segments do not overlap or do not coincide through the thickness S of the shaped material 1.

According to an embodiment (not shown), at least one segment of a layer 2 may be partially overlapped on at least one other segment that is alongside it in a circumferential direction.

In addition, in each layer 2, 4, 6 of carbon fibres, the number of transverse segments 10 is higher than the number of radial segments 8.

It follows that, innovatively, through the asymmetric or anisotropic structure discussed previously, this invention allows drastically reducing the occurrence of cracks or fractures in the shaped material. For this reason, this material is suitable for applications where—among other characteristics—also a high flexural strength is desired.

According to an advantageous variant, the number of transverse segments 10 is greater—in particular of at least one unit, of at least two units or three or more units—with respect to the number of radial segments 8.

In other words, in the shaped material 1 according to this variant, it is preferable that there be a more pronounced prevalence of transverse segments 10 with respect to the radial segments 8.

According to a particularly preferred embodiment, inside one or more layers 2, 4, 6 of carbon fibres, five radial segments 8 could alternate with at least six or at least seven transverse segments 10.

According to a further embodiment, five transverse segments 10 could alternate with at least one, at least two or at least three radial segments 8.

Optionally, the shaped material 1 could comprise zones of silicon carbide SiC obtained by reaction of part of the carbon C of said carbon fibres, and/or of the carbonaceous matrix of said shaped material 1, with at least part of a silicon Si infiltrated in said material 1.

According to a preferred embodiment, the silicon carbide zones could be arranged to bridge between layers 2, 4, 6 of adjacent carbon fibres.

The above objective is further solved by means of a method for the manufacture of the shaped material 1 according to any of the preceding embodiments.

Therefore, even if not explicitly stated, preferred or accessory variants of such a procedure could include any characteristic deductible even only implicitly, from a structural point of view, from the foregoing description.

The method comprises the following steps:

i) in a direction of construction X, stacking (and optionally needling) a plurality of layers 2, 4, 6 of carbon fibres or of precursors of said fibres, each of which comprises a plurality of radial segments 8 and transverse segments 10 placed side by side and joined together to form said layer, the number of transverse segments 10 of each layer 2,4,6 being higher than the number of radial segments 8;

ii) subjecting the product of step, i) to a heat treatment or to a thermochemical treatment, so as to densify said product and thereby obtain said shaped material 1;

iii) optionally infiltrating the product of step ii) with an infiltrating agent, such as silicon or silicon carbide.

According to a preferred variant, the step of stacking comprises a step of arranging the segments 8, 10 in a spiral around the direction of construction X, in a substantially continuous manner through the plurality of layers 2, 4, 6 of carbon fibres.

According to a further preferred variant, the infiltrating agent comprises silicon Si. According to this variant, during step iii), part of the carbon C of the carbon fibres, and/or the carbonaceous matrix of such shaped material 1, forms silicon carbide SiC by reaction with part of the infiltrated silicon Si.

According to a particularly preferred embodiment, the needling step in step i) could comprise one or more phases of transposing—for example by means of shaped needles—the carbon fibres or the precursors of these fibres through the thickness of the different layers 2, 4, 6 of the shaped material 1.

It should be clarified that, in step i), the layers 2, 4, 6 could include both carbon fibres (i.e., already carbonised fibres), or precursors of such fibres (for example fibres of oxidised polyacrylonitrile) that turn into carbon fibres during an optional carbonisation step downstream of step i).

Innovatively, the shaped material and method of this invention allow brilliantly solving the drawbacks of the prior art.

More precisely, the previously discussed asymmetric structure allows reducing—or even eliminating—the weak points of low resistance of the known shaped materials, at the same time maintaining a good level of isotropy in the behaviour of these during use.

Advantageously, the method and the shaped material of this invention can be implemented with great simplicity in any existing production line, especially by virtue of its constructive simplicity.

Advantageously, the method and the shaped material of this invention allow achieving considerable economies of manufacture, by virtue of the fact that specific processing does not require supplementary or additional equipment respect to those normally provided.

To the embodiments of the aforesaid method and shaped material, one skilled in the art, in order to meet specific needs, may make variants or substitutions of elements with others functionally equivalent.

Even these variants are contained within the scope of protection, as defined by the following claims.

Moreover, each of the variants described as belonging to a possible embodiment can be realised independently of the other variants described.

The invention claimed is:

1. Shaped material configured as a disc for a disc brake, comprising a plurality of layers of carbon fibres or precursors of said fibres stacked in a direction of construction, each layer comprising a plurality of segments placed side by side and joined together to form said layer, the segments of a layer comprising radial segments and transverse segments;
   wherein the radial segments are segments in which the carbon fibres are predominantly oriented in a radial direction relative to the direction of construction or oriented substantially parallel to the radial direction, and the transverse segments are segments in which the carbon fibres are directed in an incident direction incident to said radial direction;
   wherein the plurality of radial and transverse segments of each layer of carbon fibres or of precursors of said fibres stacked in the direction of construction are placed side by side and joined together to form said layer;

wherein, in each layer of carbon fibres or precursors of said fibres, the number of transverse segments is higher than the number of radial segments.

2. Shaped material according to claim 1, wherein the number of transverse segments is higher by at least two units than the number of radial segments.

3. Shaped material according to claim 1, wherein, inside one or more layers of carbon fibres, five radial segments are alternated with at least six transverse segments.

4. Shaped material according to claim 1, wherein, relative to the direction of construction, the segments of one layer are angularly staggered with respect to the segments of an adjacent layer so that joining zones between the segments do not overlap through a thickness of said material.

5. Shaped material according to claim 1, wherein the segments extend in a spiral around the direction of construction in a substantially continuous manner through the plurality of layers of carbon fibres.

6. Shaped material according to claim 1, in which the number of layers of carbon fibres or the number of coils of said segments is in the range 18-40.

7. Shaped material according to claim 1, in which the incident direction is substantially perpendicular to the radial direction.

8. Shaped material according to claim 1, wherein at least part of the segments are in the form of a circular sector or circumference arc, of a circumferential width in the range 60-90°.

9. Shaped material according to claim 1, wherein each segment comprises unidirectional carbon fibres, arranged in the radial direction or in the incident direction.

10. Shaped material according to claim 1, wherein at least part of the carbon fibres, are derived from oxidised polyacrylonitrile fibres.

11. Shaped material according to claim 1, in which the direction of construction is oriented parallel to a rotation axis of the shaped material or of the disc for a disc brake, during use.

12. Shaped material according to claim 1, comprising areas of silicon carbide obtained by reaction of part of the carbon of said carbon fibres, and/or of a carbonaceous matrix of said shaped material, with at least part of a silicon infiltrated in said material, said regions of silicon carbide being arranged to bridge layers of adjacent carbon fibres.

13. Shaped material according to claim 1, wherein the shaped material has a residual porosity of less than 5%.

14. A method for making a shaped material configured as a disc for a disc brake, comprising a plurality of layers of carbon fibres stacked in a direction of construction, each layer comprising a plurality of segments placed side by side and joined together to form said layer, the segments of a layer comprising radial segments and transverse segments;

wherein the radial segments are segments in which the carbon fibres are predominantly oriented in a radial direction relative to the direction of construction or oriented substantially parallel to the radial direction, and the transverse segments are segments in which the carbon fibres are directed in an incident direction incident to said radial direction;

wherein, in each layer of carbon fibres, the number of transverse segments is higher than the number of radial segments; the method, comprising the following steps:

i) in the direction of construction, stacking the plurality of layers of carbon fibres or of precursors of said fibres, each of said carbon fibres or of precursors of said fibres comprises the plurality of radial and transverse segments placed side by side and joined together to form said layer, the number of transverse segments of each layer being higher than the number of radial segments;

ii) subjecting the product of step i) to a heat treatment or to a thermochemical treatment, so as to densify said product and thereby obtain said shaped material;

iii) infiltrating the product of step ii) with an infiltrating agent comprising silicon or silicon carbide.

15. Method according to claim 14, wherein the step of stacking comprises a step of arranging the segments in a spiral around the direction of construction, in a substantially continuous manner through the plurality of layers of carbon fibres.

16. Method according to claim 14, wherein the infiltrating agent comprises silicon and wherein, during step iii), part of the carbon of the carbon fibres, and/or of a carbonaceous matrix of said shaped material, forms silicon carbide by reaction with part of the infiltrated silicon.

17. The shaped material according to claim 1, wherein the plurality of layers of carbon fibres or precursors of said fibres stacked in the direction of construction comprises heat treated or thermochemically treated carbon fibres or precursors of said fibres.

18. The shaped material according to claim 1, wherein the plurality of layers of carbon fibres or precursors of said fibres stacked in the direction of construction comprises carbon fibres or precursors of said fibres infiltrated with an infiltrating agent comprising silicon or silicon carbide.

19. A Method for making a shaped material configured as a disc for a disc brake, comprising a plurality of layers of carbon fibres stacked in a direction of construction, each layer comprising a plurality of segments placed side by side and joined together to form said layer, the segments of a layer comprising radial segments and transverse segments;

wherein the radial segments are segments in which the carbon fibres are predominantly oriented in a radial direction relative to the direction of construction or oriented substantially parallel to the radial direction, and the transverse segments are segments in which the carbon fibres are directed in an incident direction incident to said radial direction;

wherein, in each layer of carbon fibres, the number of transverse segments is higher than the number of radial segments; the method comprising the following steps:

i) stacking a plurality of layers of carbon fibres or of precursors of said fibres in the direction of construction, each of said carbon fibres or of precursors of said fibres comprises a plurality of radial and transverse segments placed side by side and joined together to form said layer, the number of transverse segments of each layer being higher than the number of radial segments;

ii) subjecting the product of step i) to a heat treatment or to a thermochemical treatment, so as to densify said product and thereby obtain said shaped material.

* * * * *